(12) United States Patent
Mason

(10) Patent No.: US 8,135,965 B2
(45) Date of Patent: Mar. 13, 2012

(54) APPARATUS AND METHOD FOR DISTRIBUTED STANDBY POWER PROVISION

(75) Inventor: James S. Mason, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 12/113,524

(22) Filed: May 1, 2008

(65) Prior Publication Data

US 2008/0272656 A1     Nov. 6, 2008

(30) Foreign Application Priority Data

May 3, 2007    (GB) ................................. 07107427.2

(51) Int. Cl.
    *G06F 1/00*          (2006.01)
    *G06F 11/00*        (2006.01)
(52) U.S. Cl. ............................. 713/300; 714/22; 714/24
(58) Field of Classification Search .................. 713/300, 713/324
See application file for complete search history.

(56) References Cited

U.S. PATENT DOCUMENTS

| | | | | |
|---|---|---|---|---|
| 4,510,400 A | * | 4/1985 | Kiteley | ........................... 307/66 |
| 5,570,837 A | * | 11/1996 | Brown et al. | ................ 236/46 R |
| 5,914,542 A | * | 6/1999 | Weimer et al. | ................ 307/125 |
| 6,420,860 B1 | * | 7/2002 | Yamaguchi | .................... 323/288 |
| 6,465,984 B2 | | 10/2002 | Fukuoka et al. | |
| 7,224,259 B2 | * | 5/2007 | Belmond et al. | ............. 340/5.72 |
| 7,392,429 B2 | * | 6/2008 | Frank et al. | ..................... 714/24 |
| 2002/0009133 A1 | * | 1/2002 | De Clercq et al. | ............ 375/222 |
| 2006/0139069 A1 | | 6/2006 | Frank et al. | |

FOREIGN PATENT DOCUMENTS

CN           1351296        5/2002

* cited by examiner

*Primary Examiner* — Suresh Suryawanshi
(74) *Attorney, Agent, or Firm* — Lieberman & Brandsdorfer, LLC

(57) ABSTRACT

An apparatus and method for providing standby power to a node of a distributed system of devices. The apparatus includes: a current manager operable to manage supply of current to a device at the node; a normal current supplier operable to supply normal operating current to the device; and a super capacitor at the node operable to supply standby operating current to the device under control of the current manager when the normal current supplier fails to supply the normal operating current to the device. The apparatus preferably further comprises a switching regulator, operable in electrical communication with the super capacitor and the device, to regulate the standby operating current to the device.

16 Claims, 2 Drawing Sheets

APPARATUS AND METHOD FOR DISTRIBUTED STANDBY POWER PROVISION

FIELD OF THE INVENTION

The present invention relates to an apparatus and method for the efficient delivery of standby power to manage controlled shutdown of a storage subsystem when primary power has been lost.

BACKGROUND OF THE INVENTION

A basic requirement of a high availability distributed device system, such as a disk file subsystem, is to manage its data in an appropriate manner when the power supply is removed. In the case of short duration power interruptions, (less than 30 milliseconds) a subsystem would be expected to continue operating normally. If a longer power supply interruption occurred then the subsystem should shut down in a controlled manner without any loss of data. In the latter case, the system would be expected to continue running for a period of around 300 seconds while any data residing in temporary storage, such as cache memory, was written to disk. Normally the latter requirement has been achieved using UPS (uninterruptible power supply) technology to protect the complete disk file subsystem or the storage controller.

This approach has disadvantages. The number of UPS devices which can be economically and practically employed in a subsystem is limited by their cost and size. In addition, the UPS is dependant upon battery technology which may need to be maintained during the life of the product. Also, it is difficult to integrate the operation of the UPS within the disk file subsystem.

Therefore, it would thus be desirable to have a technology for the efficient delivery of standby power to manage the controlled shutdown of a device subsystem, such as a storage subsystem, when primary power has been lost.

SUMMARY OF THE INVENTION

The present invention accordingly provides a method and system for managing power distribution in a storage subsystem.

In one aspect of the invention, an apparatus is provided for standby power to a node of a distributed system of devices. The apparatus includes a current manager operable to manage supply of current to a device at the node, a normal current supplier operable to supply normal operating current to the device, and a super capacitor at the node operable to supply standby operating current to the device under control of the current manager when the normal current supplier fails to supply the normal operating current to the device.

In another aspect of the invention, a method is provided for controlling apparatus for providing standby power to a node of a distributed system of devices. Supply of current by a current manager to a device at the node is monitored. Normal operating current is supplied by a normal current supplier to the device. Standby operating current is supplied by a super capacitor at the node to the device under control of the current manager when the normal current supplier fails to supply the normal operating current to the device.

Preferred embodiments of the invention thus contemplate, in their broadest aspect, a technology for the efficient delivery of standby power to manage the controlled shutdown of a device subsystem, such as a storage subsystem, when primary power has been lost.

BRIEF DESCRIPTION OF THE DRAWINGS

A preferred embodiment of the present invention will now be described, by way of example only, with reference to the accompanying drawing figures, in which.

DETAILED DESCRIPTION OF THE PREFERRED EMBODIMENTS

The preferred embodiment of the present invention provides an alternative approach where the energy storage function of the UPS is replaced by super capacitors (alternatively known as a ultra capacitors) which are distributed around a subsystem, for example at each node. In this way, the standby power requirement can be efficiently fulfilled in terms of volumetric capacity with the distributed solution, offering further advantages of increased redundancy and resilience to power interruptions.

By using super capacitors as the energy storage element, an efficient solution (in terms of volume and weight) can be achieved and energy storage can be more readily distributed around the system. This increased resilience from failure and improvements in the electrical performance, which can provide further possible improvements in power, packaging, cooling and cost.

A super capacitor, or ultra capacitor, is an electrochemical double layer capacitor device which is an energy storage device with a performance between that of a battery and traditional capacitor. The high power density of a super capacitor offers a good solution to managing short duration power demand and is well suited to this application compared to the lower power density (although higher energy density) of a battery. The super capacitor does not normally require any form of maintenance during the life of the component which may not be the case with an equivalent battery technology. Super capacitors of 60F with a rating of 15V, are commercially available. If such a capacitor was discharged from 15V to 5V then it could supply a current of 2 A for 300 s. At this rate of discharge, the average power provided over this 300 s period is 20 W.

The power dissipation of a typical modern server class disk drive is 18 W. So the super capacitor discharged over this range could maintain the power to the drive over the 300 s required for a subsystem to power down in a controlled manner. The volumetric size of the super capacitor could be 216 mm×69 m×38 mm or less which would make integration into the drive carrier or subsystem backplane feasible. The super capacitor output voltage needs to be converted with high efficiency to the regulated supplies required by the disk drive and this can be accomplished using a buck-boost switching voltage regulator. It is possible to achieve efficiencies of 95% or more with commercially available devices and these are capable of operating over the working range of the super capacitor, which is 5V to 15V in the given example, and would supply the regulated supplies (typically +5V and +12V) required by the disk drive.

Figure 1:
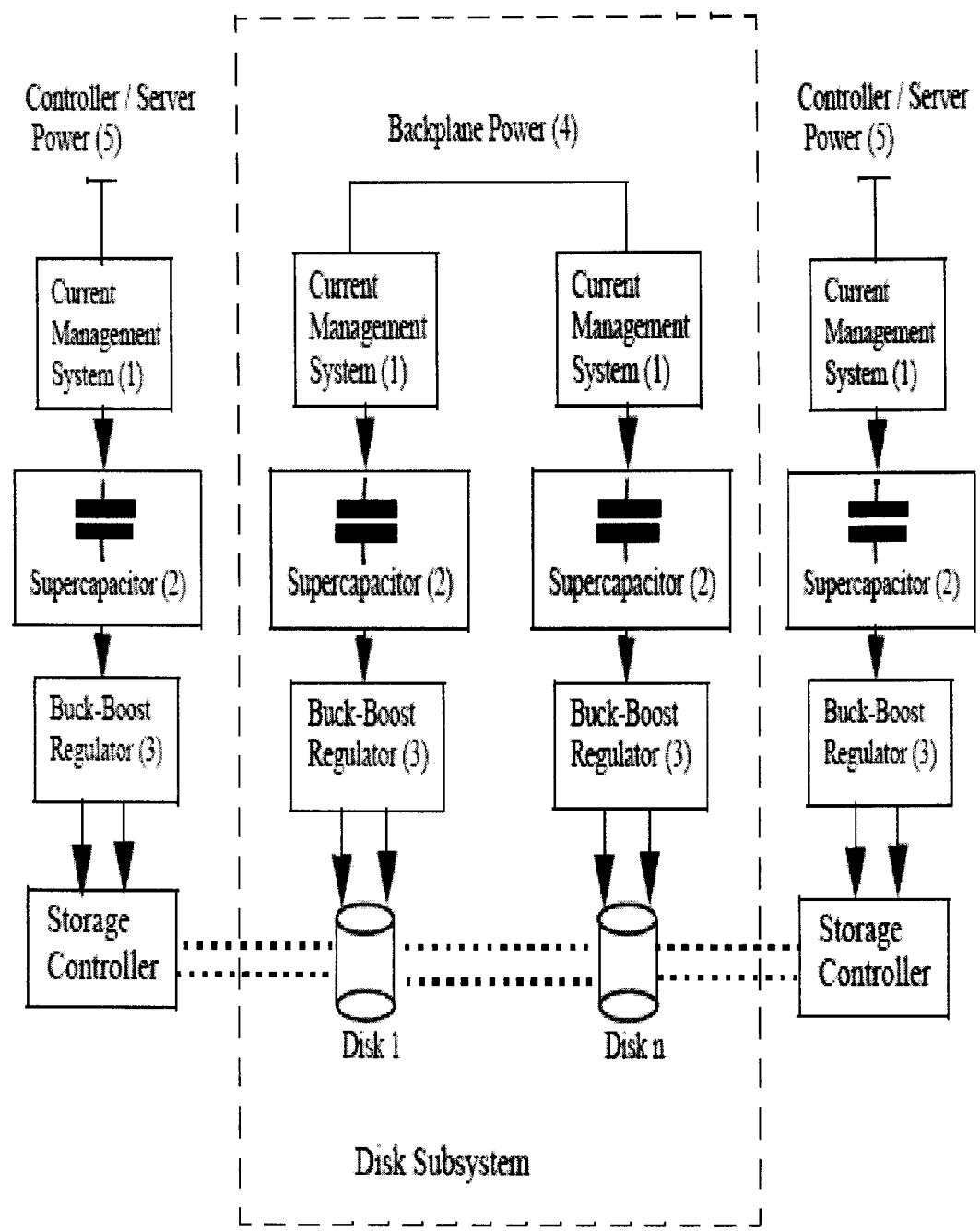
FIG. 1 is a schematic showing an arrangement of an apparatus in accordance with a preferred embodiment of the present invention.

A possible implementation is shown in FIG. 1. In this application each node, which is defined as a point at which data is stored or controlled, is powered through a super capacitor (2). Power is passed to the super capacitor from the power supply associated with that node which might be the backplane power supply for the disk file enclosure (4) or the server power supply for the storage controller (5). The flow of power into the super capacitor (and its connected node) is controlled by a current management system (1) and the conversion of the energy from the super capacitor to the node is provided by a buck-boost regulator (3) which can achieve efficient energy conversion for output voltages above and below the super capacitor voltage.

It will be clear to one of ordinary skill in the art that these components (1, 2, and 3) do not have to be the same for each node. In practice they would be the same for identical nodes, for example all of those powering disk files, but may be different for the storage controller which may have different supply voltage and power requirements. However, the basic principle of operation is the same although design details may differ. All the nodes are interconnected with a high speed data interface and there is also a low speed data interface between the nodes (which can include components 1 and 3) for passing status and control information between the nodes. The actual topology of the subsystem may differ from that shown according to known solutions.

Using the current management/super capacitor/buck-boost regulator arrangement according to the preferred embodiment of the present invention, it is possible to distribute the energy storage required to power the system around the system rather than to have it located at specific locations and therefore to improve the resilience of the system by the increased redundancy which is now available. One advantage of the super capacitor approach is that it is easier to divide and distribute this device compared to a battery and the cost of duplicating the current management and regulation devices may not be high since these components are also easily scalable at relatively low cost.

It is also advantageous to distribute energy storage components around the system compared to conventional systems, as the peak power of the node (for example the motor start on disk drives) can now be provided by the super capacitor rather than the primary power supply. Consequently it may be possible to reduce the cost of the interconnect, for example the backplane power distribution, since it now has to carry lower peak power levels than in a conventional system and this may also result in subsequent reductions in packaging and cooling requirements. The supply to the super capacitor needs to be controlled to regulate the current flow into the device from the power supply. In one embodiment, a current manager controls power flow into the super capacitor.

Figure 2:
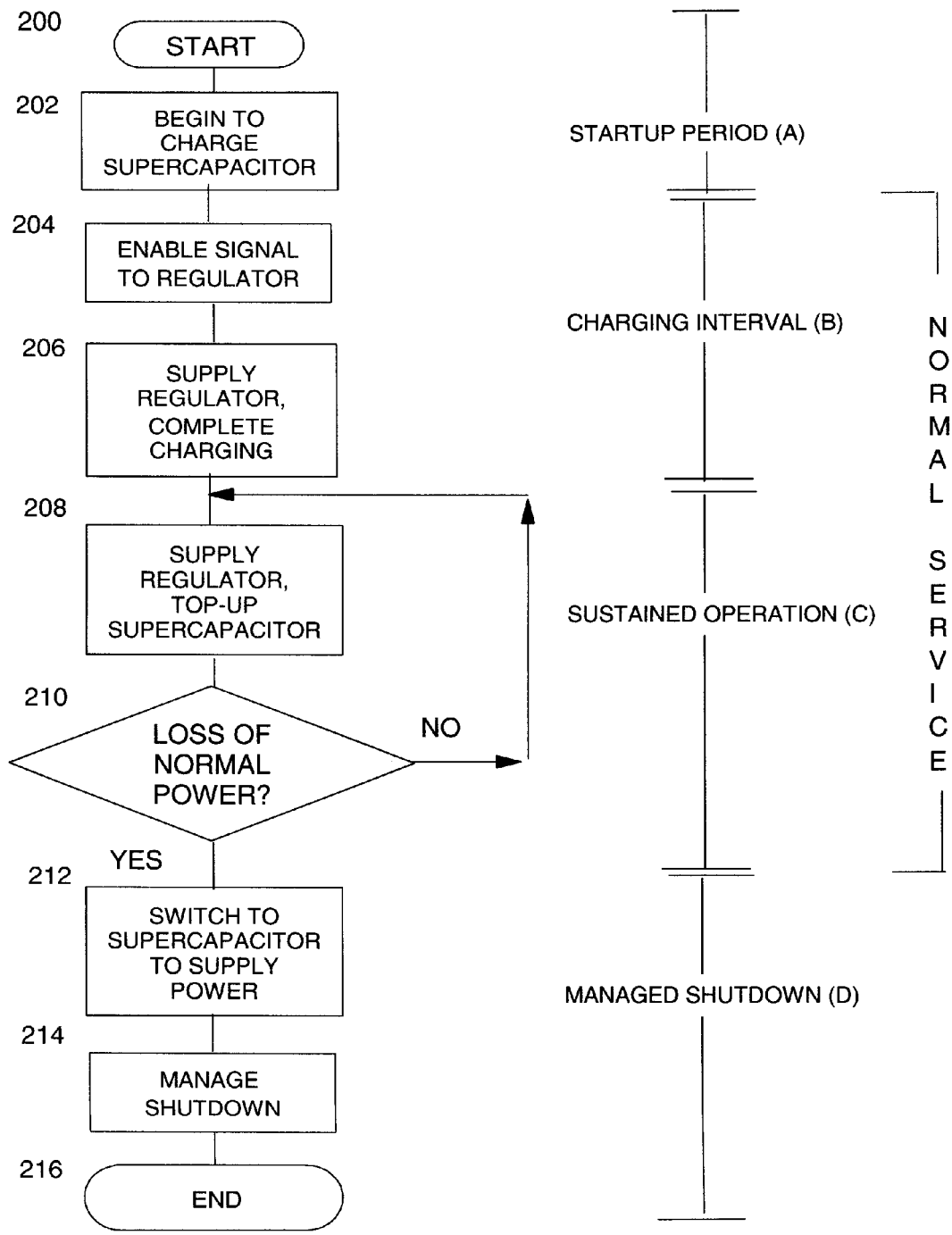
FIG. 2 is a flowchart showing a method according to a preferred embodiment of the present invention.

FIG. 2 shows a method of operating an apparatus according to the preferred embodiment of the present invention. After START step (200), at step (202), the super capacitor charging process begins. After some startup period, the determination of which will be described in more detail below, at step (204) an enable signal is sent by the current management system to a buck-boost regulator. At step (206), the regulator takes some power to power the device and continues charging the super capacitor to completion. At step (208), the charging interval (which will be continuous supply of power to the device) tops up the super capacitor to compensate for any leakage. This continues during the normal operation period. If at detection step (210), no loss of power is detected, the supply and top-up continues at repeated step (208). However, if a loss of normal power supply is detected at detection step (210), the current management system switches to the super capacitor to supply power at step (212). At step (214), a managed shutdown of the device is performed, and the process completes at END step (216).

Thus, starting from an uncharged state, the super capacitor could be charged at a controlled rate until it reaches a threshold, for example 5V, at which the system could start operating and this corresponds to the start-up period (A) of FIG. 2. The current management system could pass a signal to the buck-boost regulator which would enable the supply to the connected device or devices. For example, the system may employ a buck-boost switching regulator, operable in electrical communication with the super capacitor and the device to regulate the standby operating current to the device. In one embodiment, the device is in the form of disk storage or a disk storage controller. During the charging interval (B) of FIG. 2 between 5V and 15V, the current management system would be providing power to both the buck-boost regulator and managing the remaining charging of the super capacitor.

When the final voltage is reached, in this case 15V, the current management system just needs to supply the power requirements of the regulator and any leakage current of the super capacitor. This period (C) of FIG. 2 represents the normal operating period of the subsystem, when the super capacitors are fully charged and the system is operating normally. In the event of a supply interruption, the current management system is no longer able to provide power to its node and the loss of power is signaled to the storage controller which then initiates a controlled shutdown of the subsystem. During this period (D) of FIG. 2, the super capacitor is providing power for its connected node through the buck-boost regulator. The state of charge of each super capacitor in one embodiment could be communicated back to the controller and this information could be used to manage the system shutdown in the most energy efficient manner. Each node can continue to operate normally as the super capacitor discharges to its lower threshold. Before this lower threshold is reached, the storage controller will have managed the controlled shutdown of this node. In one embodiment, this could include disabling the buck-boost regulator to shut off power to the device and to preserve the stored energy on the super capacitor; this energy may be redistributed for use elsewhere within the subsystem or retained to reduce the delay to its normal operating state when the external power is restored.

When the primary power to the subsystem is restored, the super capacitors are recharged and, depending whether the system was in region (A), (B) or (C) of operation when shutdown occurred, the recovery time may vary but it will be no longer than the original initialization time. The system described provides power protection at each node but it follows that other levels of protection are possible. For example, in one embodiment, the super capacitor supplies operating current to the device at peak load times.

As an example, the energy storage may be placed at each individual box. Clearly, for highest efficiency, the operating voltage range of the super capacitor should approach the maximum voltage of the device. The minimum operating voltage of the buck-boost regulator defines the lower limit of operating range with the upper limit being set by super capacitor device limits. The super capacitor is inherently a low voltage device with larger voltages requiring series connection of components with the associated reduction in total capacitance and possibly reliability.

In the example given where a 15V device is discharged to 5V then almost 90% of the stored energy within the super capacitor can be recovered for use within the subsystem. Also by holding the super capacitor voltage at the lower limit (although this voltage will decay with time due to leakage), the recovery time of the subsystem will be reduced when primary power is restored since less time is spent in interval (A). Although the super capacitor can be completely discharged, there is some data to suggest that the performance of the device over time is improved if complete discharge does not normally occur.

It will be clear to one skilled in the art that many improvements and modifications can be made to the foregoing exemplary embodiment without departing from the scope of the present invention.

I claim:

1. An apparatus for providing standby power to a node of a distributed system of devices, comprising:
    multiple nodes, each of the nodes having a super capacitor associated with the node;
    a current manager operable to manage supply of current to a device at the node;
    a normal current supplier operable to supply normal operating current to the device; and
    the super capacitor at the node operable to supply standby operating current to the device under control of the current manager when the normal current supplier fails to supply the normal operating current to the device, wherein the standby power from one super capacitor is distributed to super capacitors at other nodes.

2. An apparatus as claimed in claim 1, further comprising a buck-boost switching regulator, operable in electrical communication with the super capacitor and the device, to regulate the standby operating current to the device.

3. An apparatus as claimed in claim 2, wherein the current manager is further operable to control power flow into the super capacitor.

4. An apparatus as claimed claim 1, wherein the super capacitor is further operable to supply operating current to the device at peak load times.

5. An apparatus as claimed in claim 1, wherein the device is selected from the group consisting of: a disk storage device, and a disk storage controller.

6. A method for controlling apparatus for providing standby power to a node of a distributed system of devices, comprising:
    managing power at multiple nodes, each of the nodes having a super capacitor associated with the node;
    managing supply of current by a current manager to a device at the node;
    supplying normal operating current by a normal current supplier to the device; and
    supplying standby operating current by the super capacitor at the node to the device under control of the current manager when the normal current supplier fails to supply the normal operating current to the device, wherein the standby power from one super capacitor is distributed to super capacitors at other nodes.

7. A method as claimed in claim 6, further comprising regulating the standby operating current to the device.

8. A method as claimed in claim 7, wherein the step of regulating the standby operating current to the device utilizes a buck-boost switching regulator in electrical communication with the super capacitor and the device.

9. A method as claimed in claim 6, further comprising controlling power flow into the super capacitor.

10. A method as claimed in claim 9, wherein the step of controlling power flow in the super capacitor is performed by the current manager.

11. A method as claimed in claim 6, further comprising supplying operating current by the super capacitor to the device at peak load times.

12. A method as claimed in claim 6, wherein the device is selected from the group consisting of: a disk storage device, and a disk storage controller device.

13. A method for providing standby power to a storage device node, comprising:
    providing multiple storage device nodes, each of the nodes having a super capacitor associated with the node;
    managing supply of current by a current manager to a storage device in communication with the node;
    supplying normal operating current by a normal current supplier to the storage device in communication with the node; and
    supplying standby operating current by the super capacitor at the node to the device when the normal current supplier fails to supply the normal operating current to the device,
wherein the standby power from one super capacitor is distributed to super capacitors at other nodes.

14. A method as claimed in claim 13, wherein the node is a point at which data is stored.

15. A method as claimed in claim 13, wherein the node is a point at which data is controlled.

16. A method of claimed in claim 13, further comprising controlling the device by the current manager.

* * * * *